June 28, 1966    R. T. WENSTROM ET AL    3,257,684
APPARATUS AND METHOD OF CLEANING SCALLOPS
Filed April 11, 1963

INVENTORS.
Richard T. Wenstrom
Thomas S. Gorton, Jr.
BY Robert R. Churchill
ATTORNEY

United States Patent Office 3,257,684
Patented June 28, 1966

3,257,684
APPARATUS AND METHOD OF CLEANING SCALLOPS
Richard T. Wenstrom, 410 3rd Ave., Brunswick, Ga., and Thomas S. Gorton, Jr., 82 Larchwood Drive, Cambridge, Mass.
Filed Apr. 11, 1963, Ser. No. 272,420
17 Claims. (Cl. 17—45)

This invention relates to a method of and apparatus for separating the adductor muscle or edible portion of scallops from the viscera.

The invention has for an object to provide a novel and improved method of separting the adductor muscle from the viscera of a scallop in a simple and efficient manner.

The invention has for a further object to provide novel and improved apparatus for removing the adductor muscle from the viscera of a scallop in a rapid and economical manner.

With these general objects in view and such others as may hereinafter appear, the invention consists in the method of and apparatus for removing the adductor muscle from the viscera of scallops and in the various structures, arrangements and combinations of parts hereinafter described and particularly defined in the claims at the end of this specification.

In the drawings illustrating the preferred embodiment of the invention;

In general the present invention contemplates the removal or separation of the adductor muscle or edible portion of scallops from the viscera thereof after the scallops have been shucked from the shell in a manner such as to leave the adductor muscle and the connected viscera together. In accordance with the present invention the adductor muscle with the viscera attached thereto is placed over an opening in a support, such opening being of a size about the same size as the muscle to be removed. The muscle is then forced through the opening to shear the viscera from the muscle. In one embodiment of the invention the muscle is forced through the opening with a rod after the muscle is aligned with the opening with the fingers. In another embodiment of the invention provision is made for holding the viscera about the opening while the aligned muscle is forced through the opening. Other embodiments include means for forcing the muscle through the opening by differential pressure, such as by a vacuum in one instance, and by air pressure or hydraulic pressure in another instance.

Figure 1:
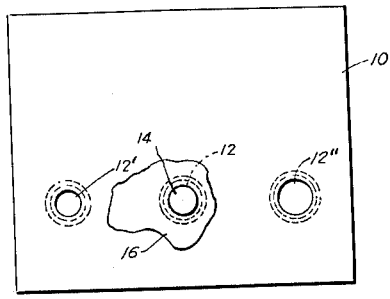
FIG. 1 is a plan view of a preshucked scallop with the viscera and adductor muscle attached placed over an opening in a support.
Figure 2:
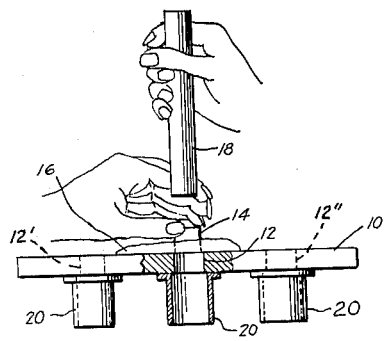
FIG. 2 is a front elevation of the same partly in cross section illustrating one form of apparatus for removing the adductor muscle from the viscera.
Figure 3:
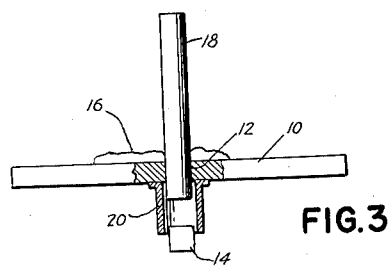
FIG. 3 is a view similar to FIG. 2 showing the muscle forced through the opening to shear the muscle from the viscera.

Referring now to the drawings and particularly to FIGS. 1 to 3, 10 represents a table or other support having one or more openings 12 therein, and 14 represents the adductor muscle of a scallop to which the viscera 16 is attached. In practicing the invention in accordance with the embodiment shown in FIG. 2, the muscle 14 is placed over the opening 12 with the fingers, the remainder of the scallop being supported on the table. The opening 12 may be substantially the same size as the muscle. As illustrated in FIG. 1, a plurality of openings 12, 12' and 12'' of different sizes may be provided in the table to accommodate scallops of different cross sectional sizes. After the muscle 14 is positioned in alignment with the opening 12 the muscle is forced through the opening by a rod 18 as illustrated in FIGS. 2 and 3. As a result, the viscera 16 is sheared from the adductor muscle 14 by the edge of the opening 12 leaving the viscera supported on the table. The muscle forced through the opening may fall through a guide chute, indicated at 20, and into a container, not shown, for subsequent cleaning and packing operations. The viscera may then be removed from the table and discarded. In practice the table 10 preferably comprises stainless steel or other non-corrosive metal.

Figure 4:
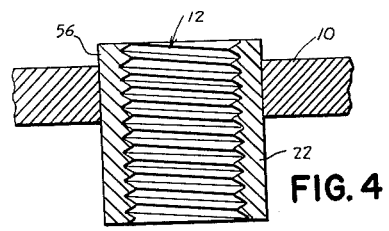
FIG. 4 is a detail view on an enlarged scale of a modified form of opening in a support through which the muscle is forced.

In a modified form of the invention, the walls of the opening may be serrated or ridged, as illustrated in FIG. 4, to effect a more thorough separation or scraping of the viscera from the muscle during the forcing operation. As herein shown, an interiorly threaded tube section 22 fitted into an opening in the table may be conveniently used for this purpose.

Figure 5:
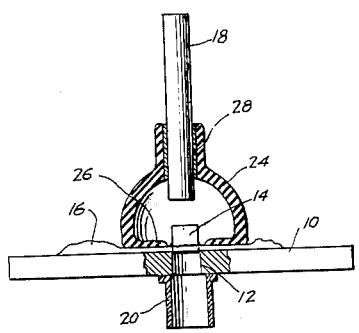
FIG. 5 is a side elevation partly in cross section of a modified form of apparatus for removing the adductor muscle from the viscera which includes means for gripping and holding the viscera about the opening.

Referring now to FIG. 5, in a modified form of the invention, an inverted cup-shaped holding member 24 having an inwardly directed resilient flange 26 is arranged to be placed over the muscle to engage and hold the viscera against the surface of the table around the opening. The bottom opening defined by the inner edges of the flange 26 is preferably of a size slightly greater than the size of the muscle to be removed. The upper end of the holding cup may be provided with a central bushed opening 28 through which the rod 18 may be guided during the forcing and shearing operation. The flange portion 26 is preferably resilient so that it may be held firmly against the viscera to hold the viscera against the surface of the table without crushing and spattering the viscera, and also so that if the flange engages a hard or unyielding portion in the viscera the flange will accommodate itself to such portion. In operation the holding cup 24 is held firmly against the edges of the opening 12 with one hand while the rod 18 is pushed downwardly to force the muscle through the opening to shear the same from the viscera.

Figure 6:
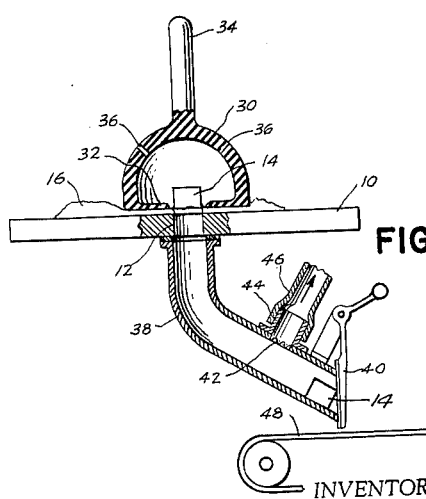
FIG. 6 is a view similar to FIG. 5 of another form of apparatus arranged to force the muscle through the opening by vacuum.

Referring now to FIG. 6, another modified form of the invention contemplates separation of the muscle 14 from the viscera 16 of the scallop by forcing the muscle through the opening 12 by vacuum. As herein shown, a cup-shaped holding member 30 is provided with a resilient flange 32 at its lower end and with a handle 34 at its upper end. The holding cup 30 is also provided with atmospheric openings 36 as shown. The underside of the opening 12 is connected by a tubular guide chute 38 which is extended at an angle, and the open end thereof is provided with a hinged flapper valve 40. The upper side of the tubular chute 38 is provided with a screened opening 42 adjacent the end thereof. A flanged fitting 44 is secured to the chute about the screened opening and is connected by a flexible conduit 46 to any usual or preferred regulated source of vacuum, not shown.

In operation the preshucked scallop with the viscera attached is placed over the opening with the muscle 14 aligned with the opening, and the holding cup is then positioned to hold the viscera against the table around the edge of the opening. Thereafter, vacuum may be applied to draw the muscle through the opening 12 to shear the muscle from the viscera. The muscle will then fall by gravity into the chute and against the flapper valve 40. The vacuum may then be discontinued and the flapper valve opened to release the muscle onto a conveyer belt 48 leading to another processing station for further operations to remove any small portions of the viscera which may be still attached to the muscle and for subsequent packing operations. In a further modification of the above-described apparatus, the holding cup may be dispensed with and the scallop positioned with the muscle over the opening to be forced therethrough by differential pressure.

It will be understood that the word "viscera" as used in the specification and in the claims is meant to include all of the parts of a preshelled or shucked scallop except the adductor muscle.

Figure 7:
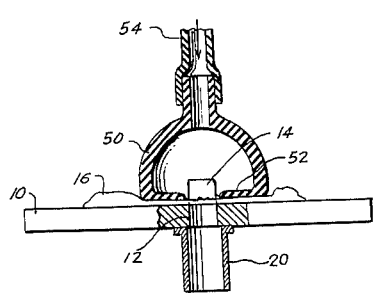
FIG. 7 illustrates in side elevation and in cross section still another form of apparatus arranged to force the muscle through the opening by air or hydraulic pressure.

In a further modified form of the present invention, as illustrated in FIG. 7, the muscle 14 is arranged to be forced through the opening 12 by air under pressure to separate the muscle from the viscera. In this embodiment a cup-shaped holding member 50 is provided having a flexible flange 52 at its lower end and having a conduit connection 54 at its upper end. The conduit 54 may lead to any usual or preferred regulated source of air under pressure. In operation, the shucked scallop with the viscera attached is placed over the opening, and the holding cup 50 is placed in gripping engagement with the viscera about the opening. The air pressure may then be applied to effect forcing of the muscle through the opening to shear the muscle from the viscera. In practice, hydraulic pressure may be substituted for the air pressure in the above-described embodiment of the invention.

As illustrated in FIG. 4, the opening 12 may be formed in a tube 22 which extends a short distance above the table as indicated at 56. The extended portion of the tube will thus serve to hold the adductor muscle aligned with the opening during the forcing operation. Also, the extended edges of the tube will prevent the viscera from dropping into the opening. This feature is of particular advantage when the muscle is forced through the opening by differential pressure wherein the extended portion of the tube provides a wall to prevent the viscera from being forced through the opening.

It will be understood that the manually operated apparatus illustrated for practicing the present invention may be embodied in automatic or semiautomatic apparatus for performing the operation of forcing the adductor muscle through the opening to shear the viscera therefrom.

In practice, some parts of the viscera may be removed prior to the forcing operation, herein described. It will be understood that other parts of the scallops which are herein defined as viscera are also edible. It will also be understood that the opening herein described as circular may take other shapes.

While the preferred embodiment of the invention has been herein illustrated and described, it will be understood that the invention may be embodied in other forms within the scope of the following claims.

Having thus described the invention, what is claimed is:

1. Apparatus for separating the adductor muscle from the viscera of a shucked scallop comprising a rigid support having an opening therein about the same size as the muscle and over which the muscle is placed with the viscera attached, and rigid means arranged to pass through the opening for forcing the muscle through said opening to shear at least a portion of the viscera from the muscle.

2. Apparatus for separating the adductor muscle from the viscera of a shucked scallop comprising a rigid support having an opening therein about the same size as the muscle and over which the muscle is placed with the viscera attached, means for forcing the muscle through said opening to shear the muscle from the viscera, said forcing means comprising a plunger rod arranged to pass through said opening and to push the muscle through said opening.

3. Apparatus for separating the adductor muscle from the viscera of a shucked scallop comprising a flat, rigid support having an opening therein about the same size as the muscle and over which the muscle is placed with the viscera attached, and means for forcing the muscle through said opening to shear the muscle from the viscera leaving behind a substantial part of the viscera on the support, said forcing means comprising means for effecting a pressure differential on opposite sides of the muscle to force the muscle through the opening.

4. Apparatus for separating the adductor muscle from the viscera of a shucked scallop comprising a flat, rigid support having an opening therein about the same size as the muscle and over which the muscle is placed with the viscera attached, and means for forcing the muscle through said opening to shear the muscle from the viscera leaving behind a substantial part of the viscera on the support, said forcing means comprising means for applying air under pressure to one side of said opening to force the muscle through the opening.

5. Apparatus for separating the adductor muscle from the viscera of a shucked scallop comprising a flat, rigid support having an opening therein about the same size as the muscle and over which the muscle is placed with the viscera attached, and means for forcing the muscle through said opening to shear the muscle from the viscera leaving behind a substantial part of the viscera on the support, said forcing means comprising means for applying water under pressure to one side of said opening to force the muscle through the opening.

6. Apparatus for separating the adductor muscle from the viscera of a shucked scallop comprising a flat, rigid support having an opening therein about the same size as the muscle and over which the muscle is placed with the viscera attached, and rigid means arranged to pass through the opening for forcing the muscle through said opening to shear the muscle from the viscera, the walls of said opening being ridged to effect scraping of the muscle as it is forced through the opening.

7. Apparatus for separating the adductor muscle from the viscera of a shucked scallop comprising a rigid support having an opening therein about the same size as the muscle and over which the muscle is placed with the viscera attached, and rigid means arranged to pass through the opening for forcing the muscle through said opening to shear the muscle from the viscera, said rigid support having a raised portion about said opening.

8. A method of separating the adductor muscle from the viscera of a shucked scallop which comprises the steps of placing the adductor muscle with the viscera attached on a rigid support having an opening about the same size as the muscle and then forcing the muscle through the rigid walls of the opening to shear at least a portion of the viscera from the muscle leaving behind a substantial portion of the viscera on the rigid support.

9. The method defined in claim 8 wherein the muscle is mechanically forced through the rigid walls of the opening by rigid means arranged to pass through the opening.

10. The method defined in claim 8 wherein the muscle is forced through the rigid walls of the opening by differential pressure.

11. Apparatus for separating the adductor muscle from the viscera of a shucked scallop comprising a support having an opening therein about the same size as the muscle and over which the muscle is placed with the viscera attached, means placed around the opening to hold the viscera against the support, and means for forcing the muscle through said opening to separate the muscle from the viscera leaving behind a substantial part of the viscera on the support.

12. Apparatus for separating the adductor muscle from the viscera of a shucked scallop comprising a support having an opening therein about the same size as the muscle and over which the muscle is placed with the viscera attached, means placed around the opening to hold the viscera against the support, and means for forcing the muscle through said opening to separate the muscle from the viscera leaving behind a substantial part of the viscera on the support, said holding means comprising an inverted cup-shaped member having a resilient flange at its lower end for holding the viscera about the opening, said forcing means comprising a rod guided through an opening in the upper end of the inverted cup and arranged to push the muscle through said opening.

13. Apparatus for separating the adductor muscle from the viscera of a shucked scallop comprising a support having an opening therein about the same size as the muscle and over which the muscle is placed with the viscera attached, and means for forcing the muscle through said opening to shear the muscle from the viscera leaving behind a substantial part of the viscera on the support, said forcing means comprising means for forcing the muscle through said opening by vacuum.

14. Apparatus for separating the adductor muscle from the viscera of a shucked scallop comprising a support having an opening therein approximately the same size as the muscle and over which the muscle is placed with the viscera attached, means for holding the viscera about one side of the opening comprising an inverted cup-shaped member, and vacuum means connected to the other side of the opening for forcing the muscle through the opening leaving behind a substantial part of the viscera on the support.

15. Apparatus for separating the adductor muscle from the viscera of a shucked scallop comprising a support having an opening therein approximately the same size as the muscle and over which the muscle is placed with the viscera attached, means for holding the viscera about one side of the opening comprising an inverted cup-shaped member, and means for applying a fluid pressure to said cup-shaped holding member to force the muscle through said opening leaving behind a substantial part of the viscera on the support.

16. A method of separating the adductor muscle from the viscera of a shucked scallop which comprises the steps of placing the adductor muscle with the viscera attached on a support having an opening approximately the same size as the muscle, holding the viscera about the opening against the surface of the support, and then forcing the muscle through the opening to shear the viscera from the muscle leaving behind a substantial part of the viscera on the support.

17. Apparatus for separating the adductor muscle from the viscera of a shucked scallop comprising a flat, rigid support having an opening therein about the same size as the muscle and over which the muscle is placed with the viscera attached, means for forcing the muscle through said opening to shear the muscle from the viscera leaving behind a substantial portion of the viscera on the support, said forcing means comprising means for effecting a pressure differential on opposite sides of the muscle to force the muscle through the opening, the walls of the opening being grooved to assist in the separation of muscle and viscera as the muscle passes through the opening.

References Cited by the Examiner

UNITED STATES PATENTS

| | | | |
|---|---|---|---|
| 1,335,133 | 3/1920 | Spjelkavik | 17—2 |
| 2,192,838 | 3/1940 | McGrew | 17—3 |
| 2,455,675 | 12/1948 | Hawk | 17—3 |
| 3,070,834 | 1/1963 | Carpenter | 17—45 |
| 3,156,948 | 11/1964 | Polito | 17—45 |

SAMUEL KOREN, *Primary Examiner.*

LUCIE H. LAUDENSLAGER, *Assistant Examiner.*